Feb. 1, 1927.
R. L. SHIPMAN
1,616,145
METHOD OF ELECTRIC ARC WELDING
Filed Dec. 11, 1925
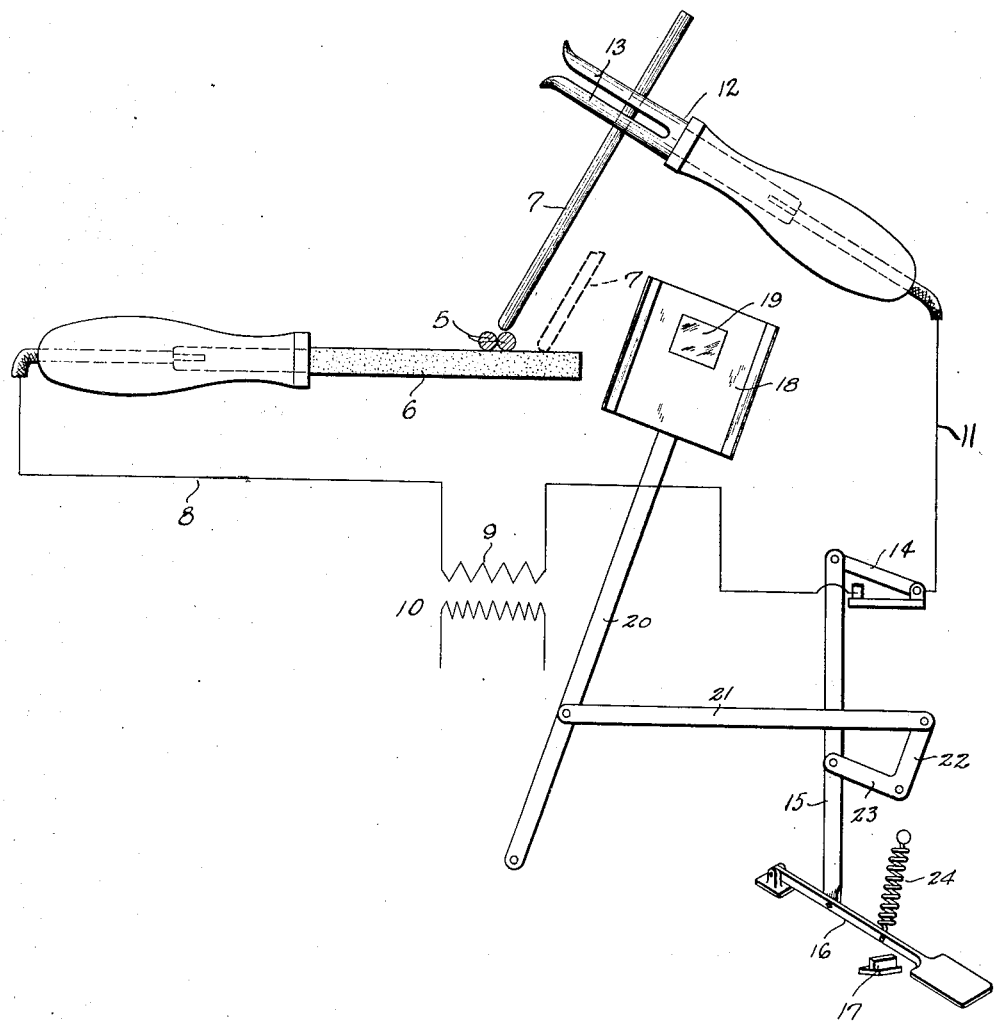
Inventor
Robert L. Shipman
By Wooster & Davis
Attorneys Patented Feb. 1, 1927.

1,616,145

UNITED STATES PATENT OFFICE.

ROBERT L. SHIPMAN, OF TRUMBULL, CONNECTICUT.

METHOD OF ELECTRIC-ARC WELDING.

Application filed December 11, 1925. Serial No. 74,688.

This invention relates to electric arc welding, and has for an object to provide a method of arc welding which will prevent the welding electrode sticking to the elements to be welded and to thus greatly facilitate the operation of welding, so that it may be performed much more rapidly, and also so that it will make a much better weld without injury to the members being welded.

In electric arc welding, when the arc is made directly from the members being welded it is, of course, necessary to first touch the welding electrode to one of these members to close the circuit to make the arc, and the high resistance at the point of contact immediately melts a portion of the electrode causing it to stick to the article. Also if the arc is broken directly from the articles welded after the welding operation is completed, as the temperatures vary with the length of the arc, being hotter the longer the arc, the operation of breaking the arc on the articles is very liable to burn them, injuring the weld and giving an unsightly joint. The sticking of the welding electrode as above described in making the arc may also injure the elements and makes it difficult to make a proper weld, particularly on relatively small articles, as there is liability of burning.

To overcome these objections I have devised a method and apparatus for forming this welding operation in which the arc is not made or broken directly on the articles to be welded, but on a separate and independent member which will not stick to the welding electrode or the articles being welded. Therefore, the welding operation may be performed easily and quickly without burning or injuring the articles and giving a much better and a more sightly joint.

In the accompanying drawing I have shown somewhat diagrammatically an apparatus for performing this welding operation, the showing being merely for the purpose of illustration as it will be obvious that other specific constructions of apparatus may be used to carry out this method.

In this drawing numeral 5 indicates in section two elements to be welded, for example two copper wires. These wires may be placed side by side or twisted together as desired. Before starting the welding operation one or both of these elements are placed near or in contact with a conducting electrode indicated at 6. This electrode is made of a conducting material which will not adhere or stick to either the articles 5 to be welded or the welding electrode 7, and it should also be of a material which will not injure the welded joint. I have found that a carbon electrode answers this purpose very well for most metals to be welded. This electrode 6 may be of any cross section desired such as square and is connected by any suitable lead 8 to the secondary 9 of any suitable type of transformer or generator 10, the other end of the secondary being connected by lead 11 to the welding electrode 7. A convenient means of doing this is the common type of holder 12 having the spring fingers 13 for gripping the electrode between them, which will provide the electrical connection and will also allow easy adjustment of the electrode or easy removal for its renewal or in changing electrodes.

In carrying out my method of welding, instead of touching the welding electrode 7, which ordinarily is of practically the same metal as the elements to be welded, to the element 5 to be welded directly to make the welding arc, I first touch this electrode to the electrode 6 as indicated in dotted lines. This, of course, will immediately close the circuit and as the electrode 6 is of a material which will not adhere or stick to the material of the welding electrode 7 it may be easily separated from the electrode 6 to form the arc and then the arc may be quickly transferred to the element 5 to be welded. This making of the arc on the electrode 6 melts a small globule on the end of the welding electrode which can be transferred to the members 5 to be welded and the weld then performed in the usual manner. After the weld is completed, instead of breaking the arc on the members 5, which is liable to burn a spot in them, the arc may be again transferred to the electrode 6 and broken from this electrode or by a separate switch. Thus at no time is there any sticking of the welding electrode to the elements to be welded and the welding operation may be performed easily and quickly and with much less liability of burning or injury to the elements to be welded. In breaking the arc after the welding operation the arc may be broken by transferring it to the electrode 6 and then breaking, or the welding electrode 7 may be first touched to the electrode 6 before breaking the circuit.

I have indicated in the drawing somewhat diagrammatically how a separate switch may be used to open the circuit after the welding operation has been completed to prevent burning of the electrodes or the elements to be welded. This comprises a switch 14 in the secondary circuit connected by a rod 15 with a foot lever 16. The switch may be of any suitable type such as an oil switch so that the contacts are separated under oil to prevent burning of the contacts. A stop 17 will limit the downward movements of the lever. This lever may also be used to move an eye protector or screen 18 to and from a position in front of the operator. This screen carries the window 19 of dark glass and is mounted on a pivoted lever 20. This lever is connected by a bar 21 to an arm 22 of a pivoted bell crank lever, the other arm 23 being connected to the rod 15. Thus in preparing to weld the operator may bring the electrodes to the proper position adjacent the articles to be welded with a clear vision and with the circuit open. By then pressing on the lever 16 the shield 18 will be shifted to a position in front of the operator to shield his eyes and the switch 14 will be closed. He may then perform the welding operation as above described. After the weld is completed the electrode 7 may be brought into contact with the electrode 6 when the operator will lift his foot and allow the spring 24 to lift lever 16, open the switch 14 and shift the guard 18 to one side and allow a clear view of the work.

It will, of course, be obvious that this method is of general application, and it has been found to work equally well in making small welds between relatively light articles, such as the joints used in assembling radio apparatus, and in which, due to the lightness of the members to be welded, there is great danger of injury from burning. At the present time, in radio apparatus as an example, the joints are soldered, and unless these joints are very carefully made they are unsatisfactory as they are liable to corrode and the desired electrical contact is not secured. With my method and apparatus, however, such connections can be made very rapidly with a good welded joint which is not only stronger but provides the required electrical connection. It is to be understood, of course, that radio apparatus is merely an example of the large number of uses to which this method may be applied.

Having thus set forth the nature of my invention, what I claim is:

1. The method of electric arc welding which consists in placing the articles to be welded near or in contact with a conductor of a substance that will not adhere to the material to be welded, making the arc between the welding electrode and said conductor, and then transferring the arc from said conductor to the articles to be welded.

2. The method of electric arc welding which consists in placing the articles to be welded near or in contact with a conductor composed of a substance that will not adhere to the material to be welded, making the arc between the welding electrode and said conductor, transferring the arc from said conductor to the articles to be welded, transferring the arc back to the conductor after the weld is completed, and breaking the arc on said conductor.

3. The method of electric arc welding which consists in placing the articles to be welded near or in contact with a carbon conductor, making the arc between said conductor and the welding electrode, and transferring the arc from said conductor to the articles to be welded.

4. The method of electric arc welding which consists in placing the articles to be welded near or in contact with a carbon conductor, making the arc between said conductor and the welding electrode, transferring the arc from said conductor to the articles to be welded, transferring the arc back to the conductor after the weld is completed, and breaking the arc on said conductor.

5. The method of electric arc welding which consists in first striking an arc between the welding electrode and another electrode of a different material, and then transferring the arc unbroken to the work to be welded.

6. The method of electric arc welding which consists in first striking an arc between the welding electrode and another electrode of a different material, transferring the arc unbroken to the work to be welded, and then after the weld is completed transferring the arc back to the electrode on which it was struck and breaking the arc on this electrode.

7. The method of electric arc welding which consists in first striking an arc between the welding electrode and another electrode of a material which will not adhere to the welding electrode, and then transferring the arc unbroken to the work to be welded.

8. The method of electric arc welding which consists in first striking an arc between the welding electrode and another electrode of a material which will not adhere to the welding electrode, transferring the arc unbroken to the work to be welded, and then after the weld is completed transferring the arc back to the electrode on which it was struck and breaking the arc on this electrode.

9. The method of electric arc welding which consists in first striking an arc between the welding electrode and a carbon electrode, and then transferring the arc unbroken to the work to be welded.

10. The method of electric arc welding which consists in first striking an arc between the welding electrode and a carbon electrode, transferring the arc unbroken to the work to be welded, and then after the weld is completed transferring the arc back to the carbon electrode and breaking the arc on this electrode.

In testimony whereof I affix my signature.

ROBERT L. SHIPMAN.